Sept. 2, 1924.
W. R. C. COOK
1,507,553
WIRE ATTACHING DEVICE FOR CONCRETE FENCEPOSTS
Filed June 26, 1922
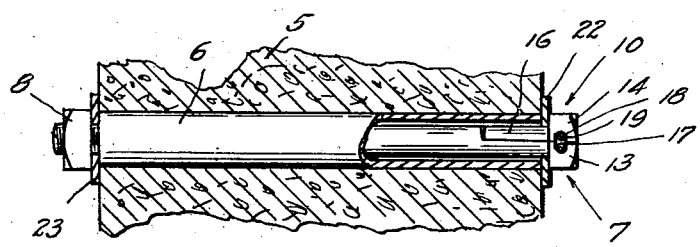
FIG. 1
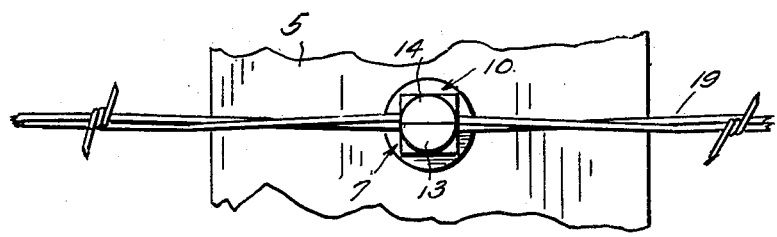
FIG. 2
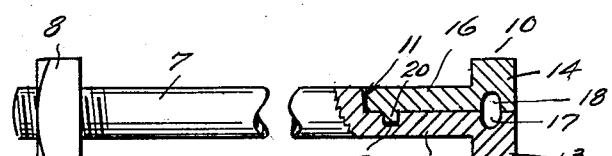
FIG. 3
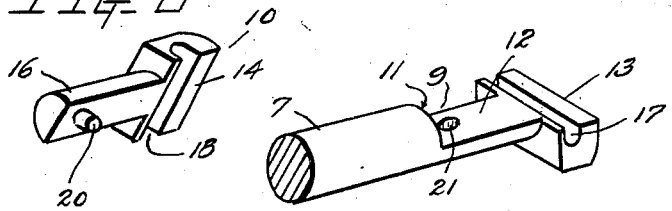
FIG. 5
FIG. 4
INVENTOR
William R. C. Cook
BY
Dierich James
ATTORNEY Patented Sept. 2, 1924.

1,507,553

UNITED STATES PATENT OFFICE.

WILLIAM R. C. COOK, OF RENTON, WASHINGTON.

WIRE-ATTACHING DEVICE FOR CONCRETE FENCEPOSTS.

Application filed June 26, 1922. Serial No. 570,842.

*To all whom it may concern:*

Be it known that I, WILLIAM R. C. COOK, a citizen of the United States, residing at Renton, in the county of King and State of Washington, have invented certain new and useful Improvements in Wire-Attaching Devices for Concrete Fenceposts, of which the following is a specification.

The object of my invention is the provision of fence post wire-attaching devices which will be simple and inexpensive to manufacture, efficient in use, and by which fence wires may be quickly attached or detached.

With these ends in view, the invention consists in various novel features of construction and arrangement of parts hereinafter described and claimed.

In the accompanying drawings,—

Figure 1 is a transverse sectional view of a portion of a fence post with devices embodying my invention applied thereto, such devices being shown partly broken away. Fig. 2 is a front elevational view of Fig. 1. Fig. 3 is a view, partly in side elevation and partly in longitudinal section, of the wire supporting and securing member shown detached. Fig. 4 is a perspective view of a part of the main bolt element, and Fig. 5 is a perspective view of the complementary bolt element of the member illustrated in Fig. 3.

The reference numeral 5 represents a portion of a fence post formed of concrete and has embedded therein a plurality of horizontally arranged tubes, such as 6, of lengths equal to or slightly less than the thickness of the post at the respective positions.

Provided for each of said tubes is a bolt having a two-part cylindrical shank portion of a length greater than the thickness of the post and of a diameter to enable it to be inserted in the tube. An end of one of the bolt parts, indicated by 7, is screw threaded for engagement in a nut 8 and at its other end is formed or provided with a recess 9 for the reception of the other part 10 of the bolt. Said recess extends from the adjacent extremity of the bolt to a shoulder 11 which is disposed to be within the tube 6 and in a plane substantially at right angles to the plane of the other side 12 of said recess, the side 12 being arranged substantially in the axis of the bolt. The portions 13 and 14 of the respective bolt parts outside of the tube are of polygonal shapes in transverse section and act complementary with each other to constitute the bolt head.

Within the tube the complementary portions 15 and 16 of the bolt parts are each of a semi-circular shape in transverse section. The head portions 13 and 14 are provided with opposed grooves 17 and 18 for the reception of a fence wire 19.

The bolt part 10 is provided adjacent to its inner end with a stud element 20 adapted to engage in a socket 21 provided therefor in the other part 7 to prevent the longitudinal separation of the bolt parts when inserted within a post tube 6.

In operation, the bolt is inserted in the tube with the wire 19 engaged in grooves 17 and 18 of the complementary head portions of the bolt parts and with the stud 20 engaged in the socket 31. Washers 22 are advantageously applied to the bolt between the post 5 and the head and nut, respectively. By screwing the nut upon the bolt the latter secures the bolt in the post and the bolt head thereof against the adjacent washer to retain the wire in place.

The construction and operation of the invention will, it is thought, be understood from the foregoing description.

While I have illustrated and described the preferred embodiment of the invention, I do not wish to limit myself to such specific constructions as changes may be made therefrom without departing from the invention as defined in the appended claim.

What I claim, is,—

A wire-attaching device for a fence post having a tube element embedded therein, a wire attaching device consisting of a bolt comprising two complementary parts and having a shank which is screw threaded at one end and having a head at its other end, said head and a portion of the shank adjacent thereto being halved to provide a recess in one part of the bolt to receive the other part of the bolt, opposing wire-receiving grooves provided in the complementary parts of the bolt head, means coacting with said tube element for detachably coupling the parts of the bolt together, and a nut engaging the threaded part of the bolt for retaining the bolt coupling means in operative position with respect to said tube element.

Signed at Seattle, Washington, this 5th day of June 1922.

WILLIAM R. C. COOK.

Witnesses:
PIERRE BARNES,
MARGARET G. SUPPLE.